(12) United States Patent
Duan et al.

(10) Patent No.: US 12,723,867 B2
(45) Date of Patent: Sep. 1, 2026

(54) DIMENSION DETECTION APPARATUS AND DETECTION METHOD, AND STACKING DEVICE

(71) Applicant: CONTEMPORARY AMPEREX TECHNOLOGY (HONG KONG) LIMITED, Hong Kong (CN)

(72) Inventors: Pengfei Duan, Ningde (CN); Dajun Ni, Ningde (CN); Jun Hu, Ningde (CN); Hongyuan Li, Ningde (CN); Shiping Feng, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 177 days.

(21) Appl. No.: 18/666,342

(22) Filed: May 16, 2024

(65) Prior Publication Data

US 2024/0302161 A1 Sep. 12, 2024

Related U.S. Application Data

(63) Continuation of application No. PCT/CN2023/071200, filed on Jan. 9, 2023.

(30) Foreign Application Priority Data

Mar. 30, 2022 (CN) ......................... 202210327957.1

(51) Int. Cl.
*G01B 11/04* (2006.01)
*H01M 10/058* (2010.01)

(52) U.S. Cl.
CPC ........... *G01B 11/04* (2013.01); *H01M 10/058* (2013.01)

(58) Field of Classification Search
CPC ...... G01B 11/04; G01B 11/27; H01M 10/058; H01M 10/04; Y02E 60/10
See application file for complete search history.

(56) References Cited

U.S. PATENT DOCUMENTS 5,219,673 A * 6/1993 Kaun .................... H01M 8/241 429/94
5,711,988 A * 1/1998 Tsai ....................... H01G 11/82 361/503

(Continued)

FOREIGN PATENT DOCUMENTS

CN 108398084 A 8/2018
CN 109307473 A 2/2019

(Continued)

OTHER PUBLICATIONS

The European Patent Office (EPO) The Extended European Search Report for Application No. 23777582.0 Mar. 7, 2025 9 Pages.

(Continued)

*Primary Examiner* — Mohamed K Amara
(74) *Attorney, Agent, or Firm* — Anova Law Group, PLLC

(57) ABSTRACT

A dimension detection apparatus configured to detect a composite electrode plate. The composite electrode plate includes a plurality of continuous first electrode plates, a plurality of second electrode plates, and two insulators. The first electrode plates are of an opposite polarity to the second electrode plates. The plurality of first electrode plates are sandwiched between the two insulators and arranged in parallel along an extension direction of the insulators. The plurality of second electrode plates are arranged alternately on outer sides of the two insulators along the extension direction of the insulators, and correspond one-to-one to the plurality of first electrode plates. The dimension detection apparatus includes: two shooting assemblies, disposed on (Continued)

two sides of the composite electrode plate respectively along a thickness direction, and configured to photograph two adjacent second electrode plates respectively.

20 Claims, 4 Drawing Sheets

(56) References Cited

U.S. PATENT DOCUMENTS

| | | | | |
|---|---|---|---|---|
| 9,046,352 | B2 * | 6/2015 | Aramaki | G01B 11/14 |
| 12,183,934 | B2 * | 12/2024 | Ono | H01M 10/0585 |
| 2004/0154160 | A1 * | 8/2004 | Hong | H01M 10/0583 29/730 |
| 2011/0104567 | A1 * | 5/2011 | Lee | H01M 10/0436 429/211 |
| 2012/0308878 | A1 * | 12/2012 | Sakashita | H01M 50/147 429/185 |
| 2014/0027643 | A1 | 1/2014 | Aramaki et al. | |
| 2015/0010807 | A1 * | 1/2015 | Dhar | H01M 10/123 429/153 |
| 2016/0006072 | A1 * | 1/2016 | Cho | H01M 10/0459 429/138 |
| 2018/0198106 | A1 * | 7/2018 | Takahashi | H01M 10/0585 |
| 2021/0313122 | A1 * | 10/2021 | Kawata | H01G 11/78 |
| 2025/0038316 | A1 * | 1/2025 | Jo | H01M 10/0587 |

FOREIGN PATENT DOCUMENTS

| | | | | | |
|---|---|---|---|---|---|
| CN | 110207745 | A | | 9/2019 | |
| CN | 110441325 | A | * | 11/2019 | H01M 10/04 |
| CN | 111322945 | A | | 6/2020 | |
| CN | 111397517 | A | | 7/2020 | |
| CN | 211234290 | U | | 8/2020 | |
| CN | 112018453 | A | | 12/2020 | |
| CN | 112330623 | A | | 2/2021 | |
| CN | 112508838 | A | | 3/2021 | |
| CN | 213140795 | U | | 5/2021 | |
| CN | 213340434 | U | | 6/2021 | |
| CN | 213340470 | U | | 6/2021 | |
| CN | 214203779 | U | * | 9/2021 | H01M 10/0583 |
| CN | 214254489 | U | | 9/2021 | |
| CN | 113532335 | A | | 10/2021 | |
| CN | 113624137 | A | | 11/2021 | |
| CN | 217504721 | U | | 9/2022 | |
| WO | 2021112481 | A1 | | 6/2021 | |

OTHER PUBLICATIONS

State Intellectual Property Office of China The Second Office Action for Application No. 202210327957.1, Nov. 5, 2025 27 pages (including translation).

A.K.Gupta et al., Industrial Automation and Robotics, China Machine Press, Jan. 2022, p. 252-255.

State Intellectual Property Office of China The First Office Action for Application No. 202210327957.1, Jun. 16, 2025 21 pages (including translation).

The World Intellectual Property Organization (WIPO) International Search Report for PCT/CN2023/071200 Jul. 12, 2023 8 Pages (including translation).

* cited by examiner

DIMENSION DETECTION APPARATUS AND DETECTION METHOD, AND STACKING DEVICE

CROSS-REFERENCE TO RELATED APPLICATIONS

This application is a continuation of International Application No. PCT/CN2023/071200, filed on Jan. 9, 2023, which is based on and claims priority to Chinese Patent Application No. 202210327957.1, filed on Mar. 30, 2022, the entire contents of both of which are incorporated herein by reference.

TECHNICAL FIELD

This application relates to the technical field of battery production, and in particular, to a dimension detection apparatus and detection method, and a stacking device.

BACKGROUND

Due to advantages such as a high energy density, a high power density, reusability for many cycles, a long shelf life, batteries such as lithium-ion batteries have been widely used in electric vehicles. Among the lithium-ion batteries, stacked-type lithium-ion batteries are superior in cycle features, safety features, and energy density, and have been widely used in recent years.

The degree of alignment between a positive electrode plate and a negative electrode plate in a stacked-type battery is an important metric to the performance of the battery. However, due to the special molding process of the stacked-type battery, how to detect the degree of alignment between the positive electrode plate and the negative electrode plate and detect other dimensions during the production is a problem that needs to be solved currently.

SUMMARY

An objective of this application is to perform real-time dimension detection on a composite electrode plate.

According to a first aspect of this application, a dimension detection apparatus is provided. The dimension detection apparatus is configured to detect a composite electrode plate. The composite electrode plate includes a plurality of first electrode plates, a plurality of second electrode plates, and two insulators. The first electrode plates are of an opposite polarity to the second electrode plates. The plurality of first electrode plates are sandwiched between the two insulators and arranged continuously in parallel along an extension direction of the insulators. The plurality of second electrode plates are arranged alternately on outer sides of the two insulators along the extension direction of the insulators, and correspond one-to-one to the plurality of first electrode plates. The dimension detection apparatus includes:

- two shooting assemblies, disposed on two sides of the composite electrode plate respectively along a thickness direction, and configured to photograph two adjacent second electrode plates respectively, where each of the shooting assemblies includes four shooting components configured to shoot images of four corner regions of one of the second electrode plates respectively; and
- a controller, communicatively connected to the two shooting assemblies, where the controller is configured to obtain dimensional parameters of the composite electrode plate based on the captured images.

In this embodiment, the shooting assemblies are disposed on the two sides of the composite electrode plate respectively to detect the second electrode plate on the front side and the second electrode plate on the back side respectively, thereby implementing real-time dimension detection of the composite electrode plate. During the movement of the composite electrode plate, the shooting assemblies can detect each second electrode plate successively to implement detection of all the second electrode plates and ensure that the dimensional parameters of the composite electrode plates meet the requirements, and especially ensure consistency of the amounts by which the negative electrode plates exceed the positive electrode plates in width. This improves the precision of alignment between the positive electrode plates and the negative electrode plates, prevents lithium plating, exerts the full functions of the positive active material of the positive electrode plate, improves the performance of the electrode assembly formed by the composite electrode plate, increases the cycle life and fast-charge capacity of the battery, and improves the safety of the battery in use.

In some embodiments, the two shooting assemblies are arranged in a staggered manner along an extension direction of the composite electrode plate.

By staggering the two shooting assemblies, this embodiment provides ample switching time that enables the two shooting assemblies to turn on at intervals, makes the shooting process of each second electrode plate independent of each other, and prevents the two shooting assemblies from turning on at a coincident time period that leads to mutual luminous interference during shooting, thereby ensuring high quality of the captured images.

In some embodiments, the dimension detection apparatus further includes a position detector. The position detector is configured to detect a position of the second electrode plate to be photographed. The controller is configured to trigger, based on the position of the second electrode plate detected by the position detector, a corresponding shooting assembly to turn on.

In this embodiment, the position detector can detect the position of the second electrode plate to be photographed, so as to accurately control the shooting assembly on the corresponding side to turn on, reliably implement detection on all the second electrode plates, and prevent the possibility of a detection omission; or, further, determine a time point at which the shooting assembly is to be turned on, prevent mutual interference between the two shooting assemblies on the basis of photographing the second electrode plates in time, and reduce power consumption of the dimension detection apparatus.

In some embodiments, the controller is configured to obtain, based on the image captured by each shooting component, a first deviation distance between an edge of the first electrode plate and an edge of the second electrode plate, and/or a second deviation distance between an edge of the insulator and the edge of the first electrode plate or the second electrode plate, whichever is wider.

In this embodiment, the alignment parameters of the corner regions of the second electrode plate can be obtained based on the images captured by each shooting component. For a second electrode plate that is rectangular, the degree of alignment between the entire second electrode plate and the first electrode plate can be ensured by ensuring the alignment between each corner region, so as to prevent lithium plating, exert the full functions of the positive active material of the positive electrode plate, improve the performance of the electrode assembly formed by the composite electrode plate, and improve the cycle life and fast-charge capacity of the battery. In addition, this also ensures alignment of the insulators with the first electrode plate or the second electrode plate in the entire extension direction, prevents a short circuit between the first electrode plate and the second electrode plate, and in turn, improves the safety of the battery in use.

In some embodiments, the controller is configured to obtain, based on images captured by any two adjacent shooting components in an identical shooting assembly, a dimension of at least one of the first electrode plate, the second electrode plate, or the insulator along a direction of spacing out the two adjacent shooting components.

In this embodiment, the dimension of the first electrode plate, the second electrode plate, or the insulator along the direction of spacing out the two adjacent shooting components can be obtained based on the images captured by two adjacent shooting components. Therefore, whether the dimensions of the first electrode plate, the second electrode plate, or the insulator meet requirements can be detected in real time during the movement of the composite electrode plate, thereby improving the performance of the electrode assembly formed by the composite electrode plate.

In some embodiments, the dimension detection apparatus further includes a memory. The memory includes a plurality of storage units. Each of the storage units is disposed by being correlated with the second electrode plate. The controller is configured to store obtained dimensional parameters into the storage unit correlated with the second electrode plate.

In this embodiment, the dimensional parameters of a plurality of second electrode plates can be stored into correlated storage units. Therefore, the dimensional parameters of a specific second electrode plate can be quickly located or retrieved subsequently. For the dimensional parameters that do not meet the requirements, the second electrode plate can be located quickly, thereby facilitating subsequent data analysis and product improvement.

In some embodiments, the controller is configured to determine whether the obtained dimensional parameters all meet preset parameter ranges, and, when the obtained dimensional parameters all meet the preset parameter ranges, cause the composite electrode plate to proceed with subsequent operations, or, when the obtained dimensional parameters do not all meet the preset parameter ranges, cause the composite electrode plate to undergo a scrapping process.

In this embodiment, based on the obtained dimensional parameters of the composite electrode plate, it is determined whether the composite electrode plate is qualified. The unqualified composite electrode plate is scrapped before the stacking process, thereby improving the production efficiency of the electrode assembly, and preventing the production efficiency from being impaired by the phenomenon that the dimensional parameters are detected as unqualified after formation of the electrode assembly.

In some embodiments, the dimension detection apparatus further includes two light source groups. The two light source groups are disposed corresponding to the two shooting assemblies respectively. Each of the light source groups includes a first light source and a second light source of different luminous colors. The first light source and the second light source are arranged on two sides of the composite electrode plate respectively along the thickness direction.

In this embodiment, the two light sources of different luminous colors jointly illuminate the two sides of the composite electrode plate, thereby not only providing sufficient light for the shooting assemblies, improving the shooting effect, but also being able to capture the edge, blocked by the separator, of the first electrode plate by letting the light penetrate the separator, and in turn, improving the accuracy and comprehensiveness of detection of the dimensional parameters of the composite electrode plate.

In some embodiments, the dimension detection apparatus further includes a clamping assembly. The clamping assembly includes two groups of grippers. The two groups of grippers are disposed on two sides of the composite electrode plate respectively along the thickness direction, and are movable along an extension direction of the composite electrode plate. The two groups of grippers are configured to clamp the composite electrode plate during shooting and keep moving synchronously with the composite electrode plate.

In this embodiment, the composite electrode plate is clamped by two groups of grippers during the shooting, thereby preventing the four corners of the second electrode plate from loosening or warping due to poor combining, enabling the second electrode plate to closely fit the insulator in the four corner regions, and preventing dimensional measurement anomalies caused by poor combining and looseness in the four corner regions of the second electrode plate. Moreover, this also ensures stable distances between the composite electrode plate and the four shooting components, improves shooting stability, and in turn, improves accuracy of detection of the dimensional parameters of the composite electrode plate. In addition, the two groups of grippers move synchronously with the composite electrode plate, thereby reducing the abrasion of the composite electrode plate sustained from the grippers, preventing the active material from falling off the second electrode plate, and ensuring the performance of the electrode assembly.

In some embodiments, the clamping assembly further includes:

- a first driving component, configured to drive the grippers to move along the extension direction of the composite electrode plate; and
- a second driving component, configured to drive the two groups of grippers to move away from or closer to each other.

The controller is configured to cause, after the first driving component drives the two groups of grippers to accelerate from an initial position to a running speed of the composite electrode plate, the second driving component to drive the two groups of grippers to approach each other to clamp the composite electrode plate.

In this embodiment, the first driving component controls the two groups of grippers to move along the extension direction of the composite electrode plate. The second driving component controls the two groups of grippers to clamp or loosen the composite electrode plate. In this way, the two actions are independent of each other, the two groups of grippers can reliably clamp the composite electrode plate during shooting, and the two groups of grippers can clamp the composite electrode plate when accelerating to a speed identical to the running speed of the composite electrode plate, thereby reducing the abrasion on the surface of the composite electrode plate, and preventing the active material from falling off.

In some embodiments, the controller is configured to cause, after the shooting assemblies complete shooting, the second driving component to drive the two groups of grippers to move away from each other to release the composite electrode plate, and cause the first driving component to drive the two groups of grippers to return to the initial position.

This embodiment allows the two groups of grippers to release the composite electrode plate first and then return to the initial position in an opposite direction after the shooting assemblies complete shooting. In this way, the two groups of grippers can return to the initial position without affecting the running of the composite electrode plate, and reduce the abrasion of the second electrode plate. In addition, the two groups of grippers can quickly return to the initial position after being detached from the composite electrode plate, so as to clamp the composite electrode plate again upon detecting a subsequent second electrode plate.

According to a second aspect of this application, a stacking device is provided, including:

- an electrode plate combining apparatus, configured to combine a plurality of first electrode plates, a plurality of second electrode plates, and two insulators to form a composite electrode plate, where the plurality of first electrode plates are arranged continuously;
- a stacking platform, configured to fold the composite electrode plate into a stack-type electrode assembly; and
- the dimension detection apparatus disclosed in the preceding embodiment, disposed between the electrode plate combining apparatus and the stacking platform, and configured to detect the composite electrode plate.

In this embodiment, a dimension detection apparatus is disposed in front of the stacking platform to detect the dimensional parameters of the composite electrode plate. The dimensional parameters can be detected in real time during running of the composite electrode plate, without affecting the production efficiency of the electrode assembly. After the dimensional parameters of the composite electrode plate are detected, unqualified composite electrode plates may be eliminated before the stacking process, without a need to perform the detection again after formation of the electrode assembly, thereby improving production efficiency and ensuring the consistency of the quality of the electrode assemblies.

According to a third aspect of this application, a dimension detection method is provided, including:

- an image shooting step: shooting images of four corner regions of a corresponding second electrode plate in a composite electrode plate by using four shooting components in a shooting assembly respectively, where the composite electrode plate includes a plurality of first electrode plates, a plurality of second electrode plates, and two insulators; the plurality of first electrode plates are sandwiched between the two insulators and arranged continuously in parallel along an extension direction of the insulators; and the plurality of second electrode plates are arranged alternately on outer sides of the two insulators along the extension direction of the insulators, and correspond one-to-one to the plurality of first electrode plates; and
- a dimension calculation step: obtaining dimensional parameters of the composite electrode plate based on a captured image.

In this embodiment, the shooting assemblies on the two sides of the composite electrode plate detect the second electrode plate on the front side and the second electrode plate on the back side respectively, thereby implementing real-time dimension detection of the composite electrode plate. During the movement of the composite electrode plate, the shooting assemblies can detect each second electrode plate successively to implement detection of all the second electrode plates and ensure that the dimensional parameters of the composite electrode plates meet the requirements, and especially ensure consistency of the amounts by which the negative electrode plates exceed the positive electrode plates in width. This improves the precision of alignment between the positive electrode plates and the negative electrode plates, prevents lithium plating, exerts the full functions of the positive active material of the positive electrode plate, improves the performance of the electrode assembly formed by the composite electrode plate, increases the cycle life and fast-charge capacity of the battery, and improves the safety of the battery in use.

Moreover, the four shooting components photograph the four corner regions of the second electrode plate on the same side of the composite electrode plate. In this way, each shooting component photographs just a relatively small region, thereby alleviating perspective distortion, where the perspective distortion is a phenomenon where objects closer to the camera appear larger, while objects farther away appear smaller in the captured image. For the same second electrode plate, by detecting the degree of alignment with the first electrode plate in the four corner regions, the degree of alignment of the entire second electrode plate relative to the first electrode plate is ensured, and the accuracy of detection of dimensional parameters is improved.

In some embodiments, before the image shooting step, the dimension detection method further includes:

- detecting a position of the second electrode plate to be photographed; and
- triggering, based on the detected position of the second electrode plate, a corresponding shooting assembly to turn on.

In this embodiment, the position of the second electrode plate to be photographed is detected beforehand, so as to accurately control the shooting assembly on the corresponding side to turn on, reliably implement detection on all the second electrode plates, and prevent the possibility of a detection omission; or, further, determine a time point at which the shooting assembly is to be turned on, prevent mutual interference between the two shooting assemblies on the basis of photographing the second electrode plates in time, and reduce power consumption in the dimension detection process.

In some embodiments, the dimension calculation step specifically includes: obtaining, based on the image captured by each shooting component, a first deviation distance between an edge of the first electrode plate and an edge of the second electrode plate, and/or a second deviation distance between an edge of the insulator and the edge of the first electrode plate or the second electrode plate, whichever is wider.

In this embodiment, the alignment parameters of the corner regions of the second electrode plate can be obtained based on the images captured by each shooting component. For a second electrode plate that is rectangular, the degree of alignment between the entire second electrode plate and the first electrode plate can be ensured by ensuring the alignment between each corner region, so as to prevent lithium plating, exert the full functions of the positive active material of the positive electrode plate, improve the performance of the electrode assembly formed by the composite electrode plate, and improve the cycle life and fast-charge capacity of the battery. In addition, this also ensures alignment of the insulators with the first electrode plate or the second electrode plate in the entire extension direction, prevents a short circuit between the first electrode plate and the second electrode plate, and in turn, improves the safety of the battery in use.

In some embodiments, the dimension calculation step specifically includes: obtaining, based on images captured by any two adjacent shooting components in an identical shooting assembly, a dimension of at least one of the first electrode plate, the second electrode plate, or the insulator along a direction of spacing out the two adjacent shooting components.

In this embodiment, the dimension of the first electrode plate, the second electrode plate, or the insulator along the direction of spacing out the two adjacent shooting components can be obtained based on the images captured by two adjacent shooting components. Therefore, whether the dimensions of the first electrode plate, the second electrode plate, or the insulator meet requirements can be detected in real time during the movement of the composite electrode plate, thereby improving the performance of the electrode assembly formed by the composite electrode plate.

In some embodiments, the dimension detection method further includes: determining whether the obtained dimensional parameters all meet preset parameter ranges, and, when the obtained dimensional parameters all meet the preset parameter ranges, causing the composite electrode plate to proceed with subsequent operations, or, when the obtained dimensional parameters do not all meet the preset parameter ranges, causing the composite electrode plate to undergo a scrapping process.

In this embodiment, based on the obtained dimensional parameters of the composite electrode plate, it is determined whether the composite electrode plate is qualified. The unqualified composite electrode plate is scrapped before the stacking process, thereby improving the production efficiency of the electrode assembly, and preventing the production efficiency from being impaired by the phenomenon that the dimensional parameters are detected as unqualified after formation of the electrode assembly.

In some embodiments, the dimension detection method further includes: causing, before shooting, two groups of grippers to clamp the composite electrode plate from two sides of the composite electrode plate along a thickness direction, and causing the two groups of grippers to keep moving synchronously with the composite electrode plate.

In this embodiment, the composite electrode plate is clamped by two groups of grippers during the shooting, thereby preventing the four corners of the second electrode plate from loosening or warping due to poor combining, enabling the second electrode plate to closely fit the insulator in the four corner regions, and preventing dimensional measurement anomalies caused by poor combining and looseness in the four corner regions of the second electrode plate. Moreover, this also ensures stable distances between the composite electrode plate and the four shooting components, improves shooting stability, and in turn, improves accuracy of detection of the dimensional parameters of the composite electrode plate. In addition, the two groups of grippers move synchronously with the composite electrode plate, thereby reducing the abrasion of the composite electrode plate sustained from the grippers, preventing the active material from falling off the second electrode plate, and ensuring the performance of the electrode assembly.

In some embodiments, the causing two groups of grippers to clamp the composite electrode plate from two sides of the composite electrode plate along a thickness direction includes:

causing the two groups of grippers to accelerate from an initial position along an extension direction of the composite electrode plate; and causing, when a speed of the two groups of grippers reaches a running speed of the composite electrode plate, the two groups of grippers to approach each other to clamp the composite electrode plate.

In this embodiment, the first driving component controls the two groups of grippers to move along the extension direction of the composite electrode plate. The second driving component controls the two groups of grippers to clamp or loosen the composite electrode plate. In this way, the two actions are independent of each other, the two groups of grippers can reliably clamp the composite electrode plate during shooting, and the two groups of grippers can clamp the composite electrode plate when accelerating to a speed identical to the running speed of the composite electrode plate, thereby reducing the abrasion on the surface of the composite electrode plate, and preventing the active material from falling off.

In some embodiments, the dimension detection method further includes:

causing, after the shooting assemblies complete shooting, the two groups of grippers to move away from each other to release the composite electrode plate; and causing, after the composite electrode plate is released, the two groups of grippers to return to the initial position.

This embodiment allows the two groups of grippers to release the composite electrode plate first and then return to the initial position in an opposite direction after the shooting assemblies complete shooting. In this way, the two groups of grippers can return to the initial position without affecting the running of the composite electrode plate, and reduce the abrasion of the second electrode plate. In addition, the two groups of grippers can quickly return to the initial position after being detached from the composite electrode plate, so as to clamp the composite electrode plate again upon detecting a subsequent second electrode plate.

BRIEF DESCRIPTION OF DRAWINGS

To describe the technical solutions of some embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

Figure 1:
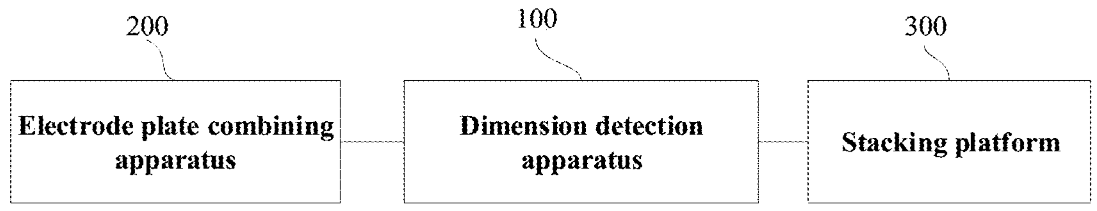
FIG. 1 is a schematic diagram of modular composition of a stacking device according to some embodiments of this application.

The drawings are not necessarily drawn to scale.

LIST OF REFERENCE NUMERALS

1. shooting assembly; 1'. shooting component; 2. light source group; 21. first light source; 22. second light source; 3. clamping assembly; 31. gripper; 311. transition portion; 32. first driving component; 33. second driving component; 4. controller; 41. lower-level controller; 42. upper-level controller; 5. position detector; 6. memory; 61. storage unit;

10. composite electrode plate; 11. first electrode plate; 111. first body portion; 112. first tab; 113. crease; 12. second electrode plate; 121. second body portion; 122. second tab; 13. insulator;

100. detection apparatus; 200. electrode plate combining apparatus; 300. stacking platform; 400. guide roller.

DETAILED DESCRIPTION OF EMBODIMENTS

The following gives a more detailed description of implementations of this application with reference to drawings and embodiments. The detailed description of the following embodiments and drawings are intended to describe the principles of this application illustratively, but not to limit the scope of this application. Therefore, this application is not limited to the described embodiments.

In the description of embodiments of this application, the term “a plurality of” means two or more (including two). Similarly, “a plurality of groups” means two or more groups (including two groups), and “a plurality of pieces” means two or more pieces (including two pieces).

A direction or a positional relationship described herein by using the terms such as “up”, “down”, “top”, “bottom”, “front”, “back”, “in”, or “out” is merely intended for ease of describing this application, but does not indicate or imply that the described device is necessarily located in the specified direction or constructed or operated in the specified direction, and therefore, is not to be understood as a limitation on the protection scope of this application.

In addition, the terms “first”, “second”, “third”, and so on are merely used for descriptive purposes, but not construed as indicating or implying relative importance. “Perpendicular” does not means exact perpendicularity, but means perpendicularity falling within an error tolerance range. “Parallel” does not mean exact parallelism, but means parallelism falling within an error tolerance range. The directional terms appearing in the following description indicate the directions shown in the drawings, but are not intended to limit specific structures in this application.

In the description of this application, unless otherwise expressly specified, the terms “mount”, “concatenate”, and “connect” are understood in a broad sense. For example, a “connection” may be a fixed connection, a detachable connection, or an integrated connection, and may be a direct connection or an indirect connection implemented through an intermediary. A person of ordinary skill in the art can understand the specific meanings of the terms in this application according to specific situations.

Reference to an “embodiment” herein means that a specific feature, structure or characteristic described with reference to this embodiment may be included in at least some embodiments of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described herein may be combined with other embodiments.

The battery mentioned in embodiments of this application means a unitary physical module that includes a plurality of battery cells to provide a higher voltage and a higher capacity. For example, the battery mentioned in this application may include a battery module, a battery pack, or the like.

A battery cell may include a lithium-ion secondary battery, a lithium-ion primary battery, a lithium-sulfur battery, a sodium-lithium-ion battery, a sodium-ion battery, a magnesium-ion battery, or the like, without being limited in embodiments of this application. The battery cell may be in various shapes such as cylindrical, flat, cuboidal or other shapes. The embodiments of this application do not limit the shape of the battery cell. In terms of the packaging form, the battery cell is typically classed into three types: cylindrical battery cell, prismatic battery cell, and pouch-type battery cell. The type of the battery cell is not limited herein.

Currently, a battery cell generally includes a housing and an electrode assembly accommodated in the housing, and the housing is filled with an electrolyte. An electrode assembly is mainly formed by stacking or winding a first electrode plate and a second electrode plate that are of opposite polarities. Generally, an insulator such as a separator is disposed between the first electrode plate and the second electrode plate. The parts, coated with an active material, of the first electrode plate and the second electrode plate, constitute a body portion of the electrode assembly. The parts, coated with no active material, of the first electrode plate and the second electrode plate respectively, constitute a first tab and a second tab respectively. In a lithium-ion battery, the first electrode plate may be a positive electrode plate, and includes a positive current collector and a positive active material layer that overlays both sides of the positive current collector. The positive current collector may be made of a material such as aluminum. The positive active material may be, for example, lithium cobalt oxide, lithium iron phosphate, ternary lithium, or lithium manganese oxide. The second electrode plate may be a negative electrode plate, and includes a negative current collector and a negative active material layer that overlays both sides of the negative current collector. The negative current collector may be made of a material such as copper. The negative active material may be, for example, graphite or silicon. Alternatively, the first electrode plate is a negative electrode plate, and correspondingly, the second electrode plate is a positive electrode plate. The first tab and the second tab may be located at one end of the body portion together or at two ends of the body portion respectively. In a charge-and-discharge process of the battery cell, the positive active material and the negative active material react with an electrolytic solution. The tabs are connected to electrode terminals to form a current circuit.

During the operation of a battery cell, some problems occur. For example, the performance is prone to degrade, and the cycle life is prone to shorten. In some cases, even safety hazards occur. Over many years, those skilled in the art have tried solving such problems from many different perspectives, but desired effects have not been achieved yet.

The applicant hereof has performed countless tests and verifications, analyzed an electrode assembly in a battery cell, and found that one of the reasons for the above problems in the battery is inconsistency of the amounts by which the negative electrode plates exceed the positive electrode plates in width in a winding process in the electrode assembly, that is, a low precision of alignment between the negative electrode plate and the positive electrode plate in the width direction. This problem may make it difficult to insert lithium ions into a negative active material region of the negative electrode plate, thereby resulting in lithium plating. In addition, it is difficult for the positive active material of the positive electrode plate to work sufficiently, thereby impairing the performance of the battery, greatly shortening the cycle life of the battery, limiting the fast-charge capacity of the battery, and even causing safety hazards such as fire and explosion.

To solve this problem, the applicant comes up with an idea of performing real-time detection on dimensional parameters of a composite electrode plate formed of a negative electrode plate, a positive electrode plate, and a separator during formation of an electrode assembly, so as to ensure conformity of the amounts by which the negative electrode plates exceed the positive electrode plates in width, and conformity of other critical dimensions, thereby improving the performance and safety of the electrode assembly. If it is found that a dimensional parameter of the composite electrode plate fails to meet requirements, the corresponding electrode plate may be removed in time, without being involved in further formation of the electrode assembly.

However, currently, among the detection apparatuses for stacked-type electrode assemblies, some can just detect the dimensional parameters of formed electrode assemblies, and some can detect just a single layer of electrode plate in a coating process. None of such devices can detect the dimensional parameters of a composite electrode plate. Therefore, an objective of this application is to provide a dimension detection apparatus to perform real-time dimension detection on a composite electrode plate.

As shown in FIG. 1, the dimension detection apparatus 100 of this application is applicable to a stacking device. The stacking device is configured to produce a stacked-type electrode assembly. The stacking device includes an electrode plate combining apparatus 200, a stacking platform 300, and a dimension detection apparatus 100.

Figure 2:
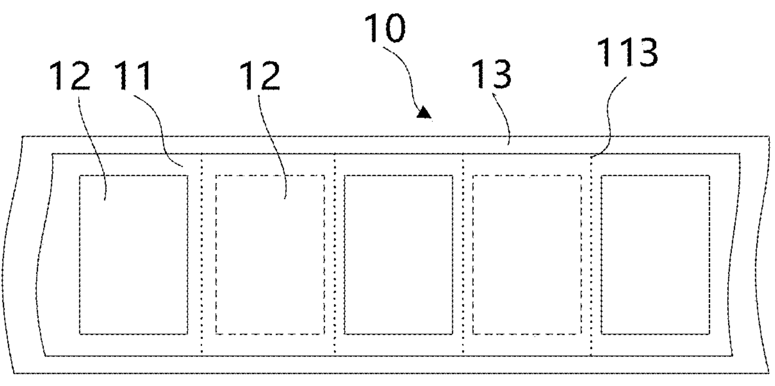
FIG. 2 is a top view of a composite electrode plate according to some embodiments.
Figure 3:
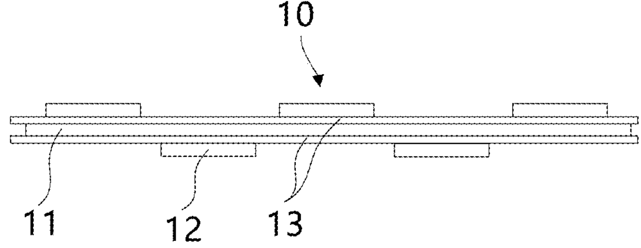
FIG. 3 is a side view of a composite electrode plate according to some embodiments.

As shown in FIG. 2 and FIG. 3, the electrode plate combining apparatus 200 is configured to combine a plurality of first electrode plates 11, a plurality of second electrode plates 12, and two insulators 13 to form a composite electrode plate 10. The stacking platform 300 is configured to fold the composite electrode plate 10 into a stack-type electrode assembly. The dimension detection apparatus 100 is disposed between the electrode plate combining apparatus 200 and the stacking platform 300, and configured to detect dimensional parameters of the composite electrode plate 10.

The first electrode plates 11 are of an opposite polarity to the second electrode plates 12. For example, the plurality of first electrode plates 11 are arranged continuously, and the plurality of second electrode plates 12 are independent of each other. Specifically, the plurality of first electrode plates 11 are sandwiched between the two insulators 13 and arranged continuously in parallel along an extension direction of the insulators. The plurality of second electrode plates 12 are arranged alternately on outer sides of the two insulators 13 along the extension direction of the insulators, and correspond one-to-one to the plurality of first electrode plates 11. Tabs are not shown in FIG. 2. When being folded into an electrode assembly, the composite electrode plate 10 may be folded in a Z-shape. To facilitate folding, a crease 113 may be provided between two adjacent first electrode plates 11.

In this embodiment, a dimension detection apparatus 100 is disposed in front of the stacking platform 300 to detect the dimensional parameters of the composite electrode plate 10. The dimensional parameters can be detected in real time during running of the composite electrode plate 10, without affecting the production efficiency of the electrode assembly. After the dimensional parameters of the composite electrode plate 10 are detected, unqualified composite electrode plates 10 may be eliminated before the stacking process, without a need to perform the detection again after formation of the electrode assembly, thereby improving production efficiency and ensuring the consistency of the quality of the electrode assemblies.

The structure of the dimension detection apparatus 100 is described below.

Figure 4:
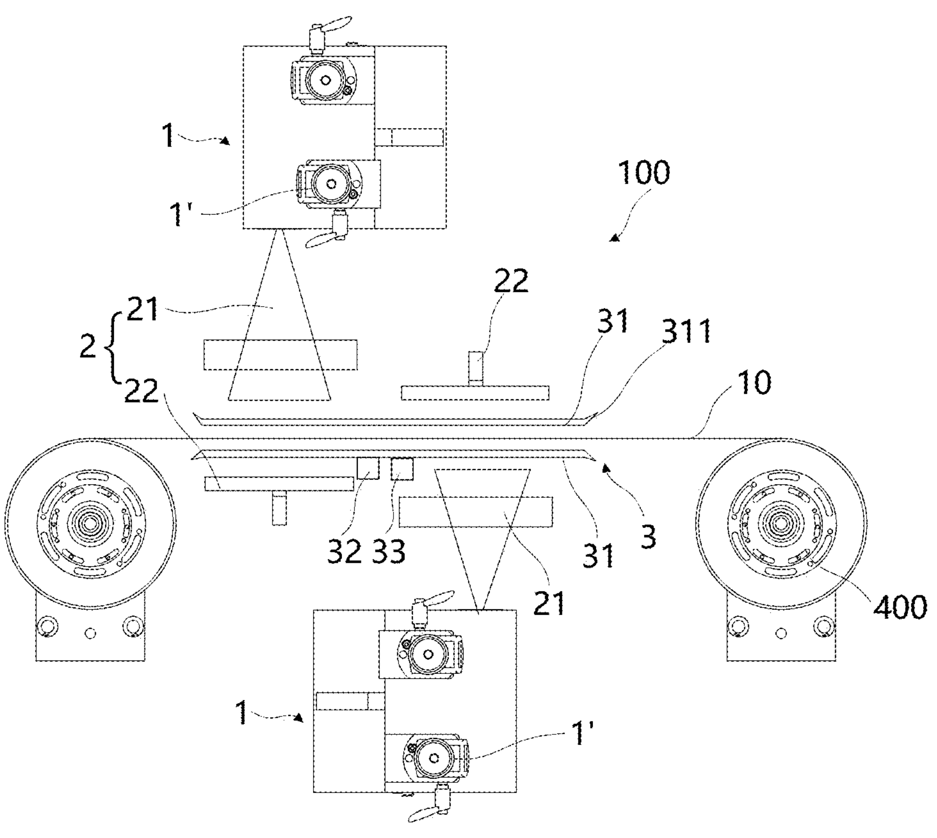
FIG. 4 is a schematic structural diagram of a dimension detection apparatus according to some embodiments of this application.
Figure 5:
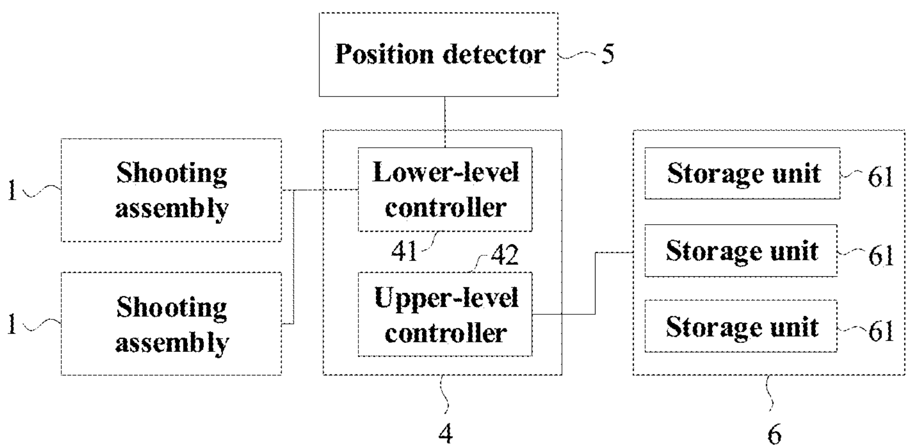
FIG. 5 is a schematic diagram of modular composition of a dimension detection apparatus according to some embodiments of this application.

In some embodiments, as shown in FIG. 4 and FIG. 5, the dimension detection apparatus 100 is configured to detect the composite electrode plate 10, and may be used as a dimension detection apparatus 100 of a stacked-type electrode assembly. The composite electrode plate 10 includes a plurality of first electrode plates 11, a plurality of second electrode plates 12, and two insulators 13. The first electrode plates 11 are of an opposite polarity to the second electrode plates 12. The plurality of first electrode plates 11 are sandwiched between the two insulators 13 and arranged continuously in parallel along an extension direction of the insulators. The plurality of second electrode plates 12 are arranged alternately on outer sides of the two insulators 13 along the extension direction of the insulators, and correspond one-to-one to the plurality of first electrode plates 11. The dimension detection apparatus 100 may include: a controller 4 and two shooting assemblies 1. The two shooting assemblies 1 are disposed on two sides of the composite electrode plate 10 respectively along a thickness direction, and configured to photograph two adjacent second electrode plates 12 respectively. Each of the shooting assemblies 1 includes four shooting components 1' configured to shoot images of four corner regions of one of the second electrode plates 12 respectively. The controller 4 is communicatively connected to the two shooting assemblies 1. The controller 4 is configured to obtain dimensional parameters of the composite electrode plate 10 based on the captured images.

The plurality of second electrode plates 12 are arranged alternately on outer sides of the two insulators 13 along the extension direction of the insulators, and correspond one-to-one to the plurality of first electrode plates 11. In other words, a blank region as wide as a second electrode plate 12 is left between two adjacent second electrode plates 12 located on the same side of the composite electrode plate 10. The opposite side of each second electrode plate 12 along the thickness direction of the composite electrode plate 10 is a blank region populated with no second electrode plate 12.

For example, the first electrode plate 11 may be a positive electrode plate, and correspondingly, the second electrode plate 12 is a negative electrode plate. Alternatively, the first electrode plate 11 is a negative electrode plate, and correspondingly, the second electrode plate 12 is a positive electrode plate. The negative electrode plate needs to exceed the positive electrode plate in width. Therefore, in some embodiments, the first electrode plate 11 serves as a negative electrode plate and the second electrode plate 12 serves as a positive electrode plate in order to make it convenient to dispose a plurality of discrete second electrode plates 12 onto the insulators 13 on the two sides of the first electrode plate 11, and to make the continuous first electrode plates 11 provide a supporting force for the edge regions of a plurality of second electrode plates 12.

In some embodiments, a plurality of first electrode plates 11 are arranged continuously to form an elongated structure. Each first electrode plate 11 may be rectangular. A crease 113 may be formed between two adjacent first electrode plates 11 to facilitate subsequent folding of the composite electrode plate 10 to form a stacked-type electrode assembly. The second electrode plate 12 may be rectangular. If the first electrode plate 11 is a negative electrode plate and the second electrode plate 12 is a positive electrode plate, then the edges around the first electrode plate 11 all exceed the second electrode plate 12. The insulators 13 may be separators, and may form an elongated structure, and are configured to separate the first electrode plate 11 from the adjacent second electrode plate 12 to prevent a short circuit.

Optionally, during the detection, the composite electrode plate 10 is in a moving state. The movement direction of the composite electrode plate 10 is guided by a guide roller 400. The four shooting components 1' in the shooting assembly 1 may be located above the four corners of the second electrode plate 12 respectively. The shooting distances between the four shooting components 1' and the composite electrode plate 10 are consistent. That is, for a horizontal extension section of the composite electrode plate 10, the four shooting components 1' are located at the same shooting height above or below the composite electrode plate 10, so as to ensure consistency of the shooting distances of the captured images.

Optionally, the shooting component 1' may be an area array camera, so as to directly photograph the four corner regions of the second electrode plate 12. For example, the shooting component is an area array camera with a high frame rate and a small field-of-view. For example, the frame rate is 60 Fps. Such a camera can meet the requirement of a high-speed stacking device for high-frequency single-shot imaging at a movement speed of 1000 mm/s. The small field-of-view can limit the shooting range of the area array camera to the corner region of the second electrode plate 12, make the captured image clearer, reduce the perspective distortion during the shooting, and improve the accuracy of dimension detection.

The controller 4 is communicatively connected to the two shooting assemblies 1. That is, each shooting component 1' is communicatively connected to the controller 4. The communication connection is classed into wired connection and wireless connection. All types of communication connection fall within the protection scope of this application, as long as signal transmission can be implemented. The dimensional parameters of the composite electrode plate 10 may be obtained based on the images captured by the shooting components 1' correlated with the composite electrode plate.

In some embodiments, the controller 4 may include a lower-level controller 41 and an upper-level controller 42. The lower-level controller 41 is configured to receive an image captured by each shooting component 1', and transmit the image to the upper-level controller 42 for analysis and processing, so as to obtain the dimensional parameters of the composite electrode plate 10. Optionally, the lower-level controller 41 may be a PLC, DSP, or the like. Considering that the image processing requires a large space, the analysis and processing of the image by the upper-level controller 42 do not reduce the speed of the lower-level controller 41 in obtaining the image, and facilitate timely discovery of the second electrode plate 12 that fail to meet the requirements in terms of dimensional parameters.

In this embodiment, the shooting assemblies 1 are disposed on the two sides of the composite electrode plate 10 respectively to detect the second electrode plate 12 on the front side and the second electrode plate on the back side respectively, thereby implementing real-time dimension detection of the composite electrode plate 10. During the movement of the composite electrode plate 10, the shooting assemblies 1 can detect each second electrode plate 12 successively to implement detection of all the second electrode plates 12 and ensure that the dimensional parameters of the composite electrode plates 10 meet the requirements, and especially ensure consistency of the amounts by which the negative electrode plates exceed the positive electrode plates in width. This improves the precision of alignment between the positive electrode plates and the negative electrode plates, prevents lithium plating, exerts the full functions of the positive active material of the positive electrode plate, improves the performance of the electrode assembly formed by the composite electrode plate 10, increases the cycle life and fast-charge capacity of the battery, and improves the safety of the battery in use.

Moreover, the four shooting components 1' photograph the four corner regions of the second electrode plate 12 on the same side of the composite electrode plate 10. In this way, each shooting component 1' photographs just a relatively small region, thereby alleviating the perspective distortion. For the same second electrode plate 12, by detecting the degree of alignment with the first electrode plate 11 in the four corner regions, the degree of alignment of the entire second electrode plate 12 relative to the first electrode plate 11 is ensured, and the accuracy of detection of dimensional parameters is improved.

In some embodiments, the two shooting assemblies 1 are arranged in a staggered manner along an extension direction of the composite electrode plate 10.

For example, the two shooting assemblies 1 may be completely staggered. Specifically, the outer contour envelope of the four shooting components 1' in one of shooting assemblies 1 forms a first reference box, and the outer contour envelope of the four shooting components 1' in the other of shooting assemblies 1 forms a second reference box. A preset interval exists between the first reference box and the second reference box in the extension direction of the composite electrode plate 10.

By setting a distance of staggering between the two shooting assemblies 1, this embodiment provides ample switching time that enables the two shooting assemblies 1 to turn on at intervals, makes the shooting processes of all the second electrode plates 12 independent of each other, and prevents the two shooting assemblies 1 from turning on at a coincident time period that leads to mutual luminous interference during shooting, thereby ensuring high quality of the captured images.

In some embodiments, the dimension detection apparatus 100 further includes a position detector 5. The position detector 5 is configured to detect a position of the second electrode plate 12 to be photographed. The controller 4 is configured to trigger, based on the position of the second electrode plate 12 detected by the position detector 5, a corresponding shooting assembly 1 to turn on.

Optionally, the position detector 5 may be a contact sensor or contactless sensor. In some embodiments, considering that the second electrode plate 12 is relatively thin, a contactless sensor may be selected. For example, an electromagnetic, photoelectric, or Hall sensor may be used. The position information of the second electrode plate 12 to be photographed, which is detected by the position detector 5, may include information indicating which side of the first electrode plate 11 the second electrode plate 12 is located at. This information is used for determining the shooting assembly 1 that needs to be turned on. Optionally, the position information may further include a distance between the second electrode plate 12 to be photographed and the shooting assembly 1. This information is used for determining the time point at which the shooting assembly 1 is to be turned on. The controller 4 may turn off the shooting assembly 1 upon completion of the shooting. A detection signal of the position detector 5 may be transmitted to a lower-level controller 41. The lower-level controller 41 controls the shooting assembly 1 to turn on.

In this embodiment, the position detector 5 can detect the position of the second electrode plate 12 to be photographed, so as to accurately control the shooting assembly 1 on the corresponding side to turn on, reliably implement detection on all the second electrode plates 12, and prevent the possibility of a detection omission; or, further determine a time point at which the shooting assembly 1 is to be turned on, prevent mutual interference between the two shooting assemblies 1 on the basis of photographing the second electrode plates 12 in time, and reduce power consumption of the dimension detection apparatus 100.

Figure 6:
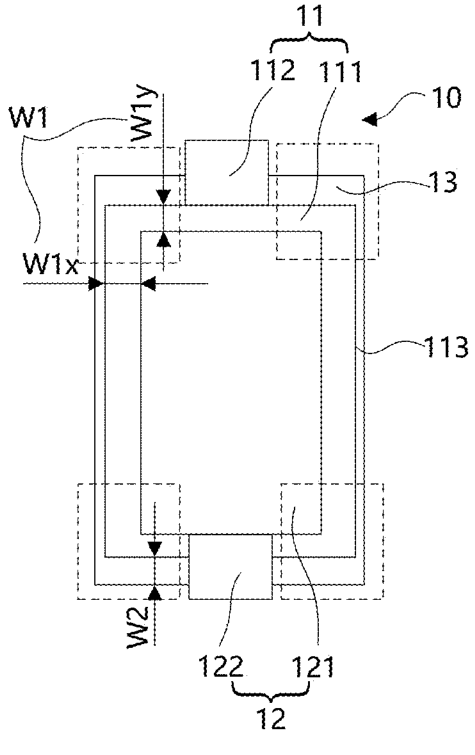
FIG. 6 is a schematic diagram of key dimensional parameters of a composite electrode plate according to this application.

In some embodiments, as shown in FIG. 6, the controller 4 is configured to obtain, based on the image captured by each shooting component 1', a first deviation distance W1 between an edge of the first electrode plate 11 and an edge of the second electrode plate 12, and/or a second deviation distance W2 between an edge of the insulator 13 and the edge of the first electrode plate 11 or the second electrode plate 12, whichever is wider.

Specifically, the first electrode plate 11 includes a first body portion 111 and a first tab 112. The first tab 112 may be led out from one side of the first body portion 111 along the width direction of the composite electrode plate 10. The second electrode plate 12 includes a second body portion 121 and a second tab 122. The second tab 122 may be led out from one side of the second body portion 121 along the width direction of the composite electrode plate 10. The first tab 112 and the second tab 122 may be located on the same side or different sides of the composite electrode plate 10.

The image captured by each shooting component 1' includes just the field-of-view region within the dashed box in FIG. 6. In order to establish the physical dimensions corresponding to a single pixel in the image, the shooting component 1' may be calibrated beforehand. In this way, the actual physical distance can be obtained based on the correspondence established in the calibration and based on the distance between the pixels on the edges of any two of the first electrode plate 11, the second electrode plate 12, or the insulator 13 in the images.

The first deviation distance W1 between the edge of the first electrode plate 11 and the edge of the second electrode plate 12 specifically includes: a first deviation sub-distance W1$x$ between the first body portion 111 and the second body portion 121 along the extension direction of the composite electrode plate 10, and a second deviation sub-distance W1$y$ between the first body portion 111 and the second body portion 121 along the width direction of the composite electrode plate 10. Based on the image captured by each shooting component 1', the first deviation sub-distance W1$x$ and the second deviation sub-distance W1$y$ can be obtained simultaneously.

The width of the insulator 13 generally exceeds the width of the first electrode plate 11 or the width of the second electrode plate 12, whichever is greater, so as to prevent a short circuit. In some embodiments, the width of the negative electrode plate exceeds the width of the positive electrode plate, and therefore, it is needed to detect the amount by which the insulator 13 exceeds the negative electrode plate in width. If the first electrode plate 11 is a negative electrode plate and the second electrode plate 12 is a positive electrode plate, then the second deviation distance W2 is a distance between the edge of the insulator 13 and the edge of the first electrode plate 11 along the width direction.

To obtain the first deviation distance W1 and the second deviation distance W2, single points may be directly selected on the edge of the first electrode plate 11, the edge of the second electrode plate 12, or edge the insulator 13, and a distance between two corresponding points is calculated. Alternatively, an image processing algorithm may be applied to intelligently fit the edges of the first electrode plate 11, the second electrode plate 12, or the insulator 13, and a distance between the two straight lines is calculated.

In this embodiment, the alignment parameters of the corner regions of the second electrode plate 12 can be obtained based on the images captured by each shooting component 1'. For a second electrode plate 12 that is rectangular, the degree of alignment between the entire second electrode plate 12 and the first electrode plate 11 can be ensured by ensuring the alignment between each corner region, so as to prevent lithium plating, exert the full functions of the positive active material of the positive electrode plate, improve the performance of the electrode assembly formed by the composite electrode plate 10, and improve the cycle life and fast-charge capacity of the battery. In addition, this also ensures alignment of the insulators 13 with the first electrode plate 11 or the second electrode plate 12 in the entire extension direction, prevents a short circuit between the first electrode plate 11 and the second electrode plate 12, and in turn, improves the safety of the battery in use.

In some embodiments, as shown in FIG. 6, the controller 4 is configured to obtain, based on images captured by any two adjacent shooting components 1' in an identical shooting assembly 1, a dimension of at least one of the first electrode plate 11, the second electrode plate 12, or the insulator 13 along a direction of spacing out the two adjacent shooting components 1'.

Specifically, at least one of the following dimensions can be obtained: the dimensions of the first electrode plate 11 along the width direction and extension direction of the composite electrode plate 10, the dimensions of the second electrode plate 12 along the width direction and extension direction of the composite electrode plate 10, and the dimension of the insulator 13 along the width direction of the composite electrode plate 10.

To obtain a corresponding physical distance between any two pixels in two adjacent images, the adjacent shooting components 1' may be calibrated beforehand. A mounting distance between the adjacent shooting components 1' may be obtained by measurement. The corresponding physical distance between two pixels in the two adjacent images may be obtained through a standard calibration tool of known physical dimensions. In this way, the actual physical distance can be obtained based on the correspondence established in the calibration and based on the distance between the pixels on opposite edges of the first electrode plate 11, the second electrode plate 12, or the insulator 13 in the adjacent images.

In this embodiment, the dimension of the first electrode plate 11, the second electrode plate 12, or the insulator 13 along the direction of spacing out the two adjacent shooting components 1' can be obtained based on the images captured by two adjacent shooting components 1'. Therefore, whether the dimensions of the first electrode plate 11, the second electrode plate 12, or the insulator 13 meet requirements can be detected in real time during the movement of the composite electrode plate 10, thereby improving the performance of the electrode assembly formed by the composite electrode plate 10.

In some embodiments, the dimension detection apparatus 100 further includes a memory 6. The memory includes a plurality of storage units 61. Each of the storage units 61 is correlated with the second electrode plate 12. The controller 4 is configured to store obtained dimensional parameters into the storage unit 61 correlated with the second electrode plate 12.

Optionally, the address of the storage unit 61 may be correlated with the serial number of the second electrode plate 12. After the dimensional parameters of the second electrode plate 12 are obtained, the obtained dimensional parameters can be stored into a corresponding storage unit 61 correlated with the serial number of the second electrode plate 12.

In this embodiment, the dimensional parameters of a plurality of second electrode plates 12 can be stored into correlated storage units 61. Therefore, the dimensional parameters of a specific second electrode plate 12 can be quickly located or retrieved subsequently. For the dimensional parameters that do not meet the requirements, the second electrode plate 12 can be located quickly, thereby facilitating subsequent data analysis and product improvement.

In some embodiments, the controller 4 is configured to determine whether the obtained dimensional parameters all meet preset parameter ranges, and, when the obtained dimensional parameters all meet the preset parameter ranges, cause the composite electrode plate 10 to proceed with subsequent operations, or, when the obtained dimensional parameters do not all meet the preset parameter ranges, cause the composite electrode plate 10 to undergo a scrapping process.

Whether the dimensional parameters all meet the preset parameter ranges means whether the alignment parameters, the dimensions of the first electrode plate 11, the dimensions of the second electrode plate 12, and the dimensions of the insulator 13 meet their respective preset parameter ranges. The alignment parameters include: a first deviation distance W1 and a second deviation distance W2. If the alignment parameters, the dimensions of the first electrode plate 11, the dimensions of the second electrode plate 12, and the dimensions of the insulator 13 all meet their respective preset parameter ranges, then it is determined that the dimensional parameters of the composite electrode plate 10 meet the requirements, and therefore, the composite electrode plate 10 is allowed to proceed with the subsequent stacking process. If any one of the dimensional parameters does not meet the requirements, the composite electrode plate is scrapped directly without participating in the subsequent stacking process.

In this embodiment, based on the obtained dimensional parameters of the composite electrode plate 10, it is determined whether the composite electrode plate 10 is qualified. The unqualified composite electrode plate 10 is scrapped before the stacking process, thereby improving the production efficiency of the electrode assembly, and preventing the production efficiency from being impaired by the phenomenon that the dimensional parameters are detected as unqualified after formation of the electrode assembly.

In some embodiments, the dimension detection apparatus 100 further includes two light source groups 2. The two light source groups are disposed corresponding to the two shooting assemblies 1 respectively. Each of the light source groups 2 includes a first light source 21 and a second light source 22 of different luminous colors. The first light source 21 and the second light source 22 are arranged on two sides of the composite electrode plate 10 respectively along the thickness direction.

Optionally, the first light source 21 is located on a side close to the shooting assembly 1, and the second light source 22 is located on a side far away from the shooting assembly 1. The first light source 21 may be white light to illuminate the shooting assembly 1 located on the same side, so that the shooting assembly 1 clearly captures the main features of the composite electrode plate 10. The second light source 22 may be red light to provide background light for the shooting assembly 1 to photograph the composite electrode plate 10. Because the red light is of a relatively long wavelength and highly penetrative, the red light can penetrate the insulator 13 and make the insulator 13 transparent, so that the image captured by the shooting assembly 1 can clearly reflect the four edges of the first electrode plate 11. In this way, the dimensional parameters related to the edges of the first electrode plate 11 are obtained, in which the edge of the first electrode plate 11 along the extension direction of the composite electrode plate 10 is a crease 113.

Optionally, the second light source 22 includes a surface light source and a line light source. The surface light source is normally luminous and configured to illuminate the edge position of the insulator 13 along the width direction, so that the edge of the insulator 13 can still be visualized after the insulator 13 is penetrated by light, so as to calculate the width of the insulator 13 and the amount by which the insulator 13 exceeds the first electrode plate 11 in the width direction. The line light source is highly luminous and under stroboscopic control, and is configured to penetrate a region located inside the edge on the insulator 13. The line light source may be disposed opposite to the first light source 21 so that background light is provided for the line light source. The back side of the second electrode plate 12 is illuminated by a combination of a surface light source and line light source, thereby not only penetrating the insulator 13 and exposing the four edges of the first electrode plate 11 for photographing, but also visualizing the edges of the insulator 13, so that the comprehensive dimensional parameters of the composite electrode plate 10 can be obtained from the image captured by the shooting assembly 1. This can solve the problem of illumination conflict caused by a single light source serving as the second light source 22. To be specific, if a red surface light source normally luminous is applied alone, it is difficult to penetrate the insulator 13; if a stroboscopic red line light source is applied alone, the entire insulator 13 is prone to be all penetrated and it is difficult to visualize the edge of the insulator 13.

Optionally, an independent first light source 21 is disposed corresponding to each of 5 the four shooting components 1' in each shooting assembly 1. Correspondingly, a second light source 22 is disposed at the back side of, and opposite to, each first light source 21. Alternatively, every two adjacent shooting components 1' along the width direction of the composite electrode plate 10 share one elongated first light source 21. The elongated first light source 21 is generally narrow in width. Therefore, by extending the first light source 21 along the width direction of the composite electrode plate 10, just one first light source 21 can simultaneously cover the two edges (that is, two creases 113) of the first electrode plate 11 along the extension direction of the composite electrode plate 10. The edges of the first electrode plate 11 can be captured without a need to align the first light source 21 with the creases 113. Alternatively, every two adjacent shooting components 1' along the extension direction of the composite electrode plate 10 share one elongated first light source 21. In disposing the light source, the first light source 21 needs to be aligned with the edge of the first electrode plate 11 along the extension direction of the composite electrode plate 10, so as to capture the edge of the first electrode plate 11.

Optionally, the brightness of the first light source 21 and the second light source 22 is adjustable, so that the brightness of the light emitted by the first light source 21 and the second light source 22 can be adjusted to appropriate contrast that can not only meet the requirement of clear imaging but also prevent image overexposure.

Optionally, for an embodiment in which the two shooting assemblies 1 are staggered along the extension direction of the composite electrode plate 10, space can be left for arranging a light source group 2, and mutual interference is prevented between the light beams emitted by the light source groups 2 corresponding to the two shooting assemblies 1 respectively, thereby improving the shooting effect of the images.

Specifically, the first light source 21 emits white light and adopts an elongated light source. The second light source 22 emits red light, and may include a line light source and a surface light source. The parameter of the line light source may be 200000 Lux, and the parameter of the surface light source may be 100000 Lux, stroboscopic.

In this embodiment, the two light sources of different luminous colors jointly illuminate the two sides of the composite electrode plate 10, thereby not only providing sufficient light for the shooting assemblies 1, improving the shooting effect, but also being able to capture the edge, blocked by the insulator 13, of the first electrode plate 11 by letting the light penetrate the insulator 13, and in turn, improving the accuracy and comprehensiveness of detection of the dimensional parameters of the composite electrode plate 10.

In some embodiments, as shown in FIG. 4, the dimension detection apparatus 100 further includes a clamping assembly 3. The clamping assembly 3 includes two groups of grippers 31. The two groups of grippers are disposed on two sides of the composite electrode plate 10 respectively along the thickness direction, and are movable along an extension direction of the composite electrode plate 10. Two groups of grippers 31 are configured to clamp the composite electrode plate 10 during shooting and keep moving synchronously with the composite electrode plate 10.

The two groups of grippers 31 are disposed opposite to each other, with spacing adjustable in between. The grippers 31 may be plate-like structures. The grippers 31 may be made of a transparent material, such as polymethyl methacrylate, so as to clamp the four corner regions of the composite electrode plate 10 without affect image shooting.

Optionally, each group of grippers 31 is a plate-like structure that at least covers the entire second electrode plate 12, such as a rectangular plate. Alternatively, each group of grippers 31 includes two grippers 31 spaced apart along the width direction of the composite electrode plate 10. Each gripper 31 extends along the extension direction of the composite electrode plate 10, and is configured to cover two adjacent corner regions of the second electrode plate 12 along the extension direction of the composite electrode plate 10. Every two of the four grippers 31 are disposed opposite to each other. This method saves the material consumed by the grippers 31. Alternatively, one of the groups of grippers 31 is a whole-piece gripper 31, and the other group of grippers 31 includes two grippers 31 spaced apart along the width direction of the composite electrode plate 10. The number of grippers 31 in each group of grippers 31 is not limited.

Optionally, the grippers 31 cover the second electrode plate 12 and expose the four corner regions of the second electrode plate 12 to facilitate the detection by the shooting assemblies 1. The grippers 31 may be rectangular plates, and the outer dimensions of the grippers are smaller than the detection region of the shooting assemblies 1; or, avoidance portions are disposed at positions corresponding to the four corner regions of the second electrode plate 12 on the grippers 31.

Optionally, in the extension direction of the composite electrode plate 10, the grippers 31 may cover a single second electrode plate 12, or may cover two or more second electrode plates 12, so as to be able to capture the images of both the front side and the back side of the second electrode plate 12 on a single occasion of clamping the composite electrode plate 10, reduce the frequency of clamping the composite electrode plate 10 by the two groups of grippers 31, and in turn, simplify the control difficulty. To prevent the edge positions of the grippers 31 from damaging the second electrode plate 12 when the grippers start or stop moving, each gripper 31 includes a transition portion 311 at two ends along the extension direction of the composite electrode plate 10. The transition portion 311 may be a plate-like structure tilting away from the composite electrode plate 10. In this way, when a bend exists at the root of the first tab 112 or second tab 122, because the distance between the upper group of grippers and the lower group of grippers 31 at the ends is relatively large, the first tab 112 or the second tab 122 can be guided into a clearance in between, thereby playing a guiding role.

In this embodiment, the composite electrode plate 10 is clamped by two groups of grippers 31 during the shooting, thereby preventing the four corners of the second electrode plate 12 from loosening or warping due to poor combining, enabling the second electrode plate 12 to closely fit the insulator 13 in the four corner regions, and preventing dimensional measurement anomalies caused by poor combining and looseness in the four corner regions of the second electrode plate 12. Moreover, this also ensures stable distances between the composite electrode plate 10 and the four shooting components 1', improves shooting stability, and in turn, improves accuracy of detection of the dimensional parameters of the composite electrode plate 10. In addition, the two groups of grippers 31 move synchronously with the composite electrode plate 10, thereby reducing the abrasion of the composite electrode plate 10 sustained from the grippers 31, preventing the active material from falling off the second electrode plate 12, and ensuring the performance of the electrode assembly.

In some embodiments, the clamping assembly 3 further includes: a first driving component 32 and a second driving component 33. The first driving component 32 is configured to drive the grippers 31 to move along the extension direction of the composite electrode plate 10. The second driving component 33 is configured to drive the two groups of grippers 31 to move away from or closer to each other. The controller 4 is configured to cause, after the first driving component 32 drives the two groups of grippers 31 to accelerate from an initial position to a running speed of the composite electrode plate 10, the second driving component 33 to drive the two groups of grippers 31 to approach each other to clamp the composite electrode plate 10.

The first driving component 32 may include a power component that outputs rotary motion and a decelerator. The decelerator is configured to convert the rotary motion output by the power component into rectilinear motion; or may be a power component that outputs rectilinear motion, such as an electrical push rod, air cylinder or hydraulic cylinder. The second driving component 33 may include two power components at the output end, and the two power components drive the two groups of grippers 31 respectively to move along opposite directions, so as to ensure synchronism of the movement of the two groups of grippers 31. Alternatively, one second driving component 33 may be disposed for each group of grippers 31.

In some embodiments, after the position detector 5 detects the second electrode plate 12, the controller 4 sends an instruction to the first driving component 32, so as to drive the two groups of grippers 31 to accelerate from the initial position to quickly reach the running speed of the composite electrode plate 10. After reaching the running speed of the composite electrode plate 10, the two groups of grippers maintains uniform motion. In this process, the controller 4 sends an instruction to the second driving component 33 to drive the two groups of grippers 31 to approach each other to clamp the composite electrode plate 10. Subsequently, the controller 4 turns on the corresponding shooting assembly 1 based on the position of the second electrode plate 12 detected by the position detector 5. Alternatively, the shooting assembly 1 may be turned on during motion of the two groups of grippers 31 or in the process of clamping the composite electrode plate 10.

In this embodiment, the first driving component 32 controls the two groups of grippers 31 to move along the extension direction of the composite electrode plate 10. The second driving component 33 controls the two groups of grippers 31 to clamp or loosen the composite electrode plate. In this way, the two actions are independent of each other, the two groups of grippers 31 can reliably clamp the composite electrode plate 10 during shooting, and the two groups of grippers 31 can clamp the composite electrode plate 10 when accelerating to a speed identical to the running speed of the composite electrode plate 10, thereby reducing the abrasion on the surface of the composite electrode plate 10, and preventing the active material from falling off.

In some embodiments, the controller 4 is configured to cause, after the shooting assemblies 1 complete shooting, the second driving component 33 to drive the two groups of grippers 31 to move away from each other to release the composite electrode plate 10, and cause the first driving component 32 to drive the two groups of grippers 31 to return to the initial position.

The dimensions of the grippers 31 may cover just a single second electrode plate 12. Upon completion of shooting by the shooting assembly 1, the controller 4 immediately causes the two groups of grippers 31 to return to the initial position, so as to be ready for clamping a next second electrode plate 12. Alternatively, the dimensions of the grippers 31 may cover two adjacent second electrode plates 12. After the two groups of grippers 31 clamp the two adjacent second electrode plates 12, the two shooting assemblies 1 are caused to capture images of the two second electrode plates 12 respectively. After both images are captured, the two groups of grippers 31 are caused to return to the initial position, so as to be ready for clamping a next group of two adjacent second electrode plates 12. This method can reduce the number of reciprocating movements of the grippers 31, lower the requirements on the movement speed, and is easy to control.

This embodiment allows the two groups of grippers 31 to release the composite electrode plate 10 first and then return to the initial position in an opposite direction after the shooting assemblies 1 complete shooting. In this way, the two groups of grippers 31 can return to the initial position without affecting the running of the composite electrode plate 10, and reduce the abrasion of the second electrode plate 12. In addition, the two groups of grippers can quickly return to the initial position after being detached from the composite electrode plate 10, so as to clamp the composite electrode plate 10 again upon detecting a subsequent second electrode plate 12.

A specific embodiment of the dimension detection apparatus 100 of this application is described below with reference to FIG. 4 and FIG. 5.

As shown in FIG. 4, the dimension detection apparatus 100 is configured to detect dimensional parameters of a stacked-type electrode assembly. The composite electrode plate 10 is wound around two guide rollers 400. The composite electrode plate 10 between the two guide rollers 400 extends horizontally.

The dimension detection apparatus 100 may include: a controller 4, two shooting assemblies 1, two light source groups 2, and a clamping assembly 3. The two shooting assemblies 1 are staggered along the extension direction of the composite electrode plate 10. Each shooting assembly 1 includes four shooting components 1'. Each shooting component is configured to shoot an image of one of the four corner regions of the second electrode plate 12. The controller 4 is configured to obtain dimensional parameters of the composite electrode plate 10 based on the captured images. In addition, the controller 4 may further detect defects such as breakage, shortage, or tab folds in the composite electrode plate 10 through the captured images. Each shooting component 1' may be calibrated beforehand, for example, jointly calibrated by a multi-camera vision technology, and the world coordinate system pose relationship is established for the same shooting component 1, thereby implementing distance measurement across the shooting components 1' with an accuracy to within 0.1 mm.

The two light source groups 2 are disposed corresponding to the two shooting assemblies 1 respectively. Each of the light source groups 2 includes a first light source 21 and a second light source 22 of different luminous colors. The first light source 21 and the second light source 22 are arranged on two sides of the composite electrode plate 10 respectively along the thickness direction. For example, the first light source 21 may emit white light, and the second light source 22 may emit red light.

The clamping assembly 3 includes two groups of grippers 31 that are disposed on two sides of the composite electrode plate 10 respectively along the thickness direction and movable along the extension direction of the composite electrode plate 10. Both groups of grippers 31 may assume a plate-like structure and be arranged parallel and opposite to each other. One group of grippers 31 are located between the composite electrode plate 10 and the first light source 21 located on the same side, and the other group of grippers 31 are located between the composite electrode plate 10 and the second light source 22 located on the same side. The two groups of grippers 31 are configured to clamp the composite electrode plate 10 during the shooting and keep moving synchronously with the composite electrode plate 10.

Figure 8:
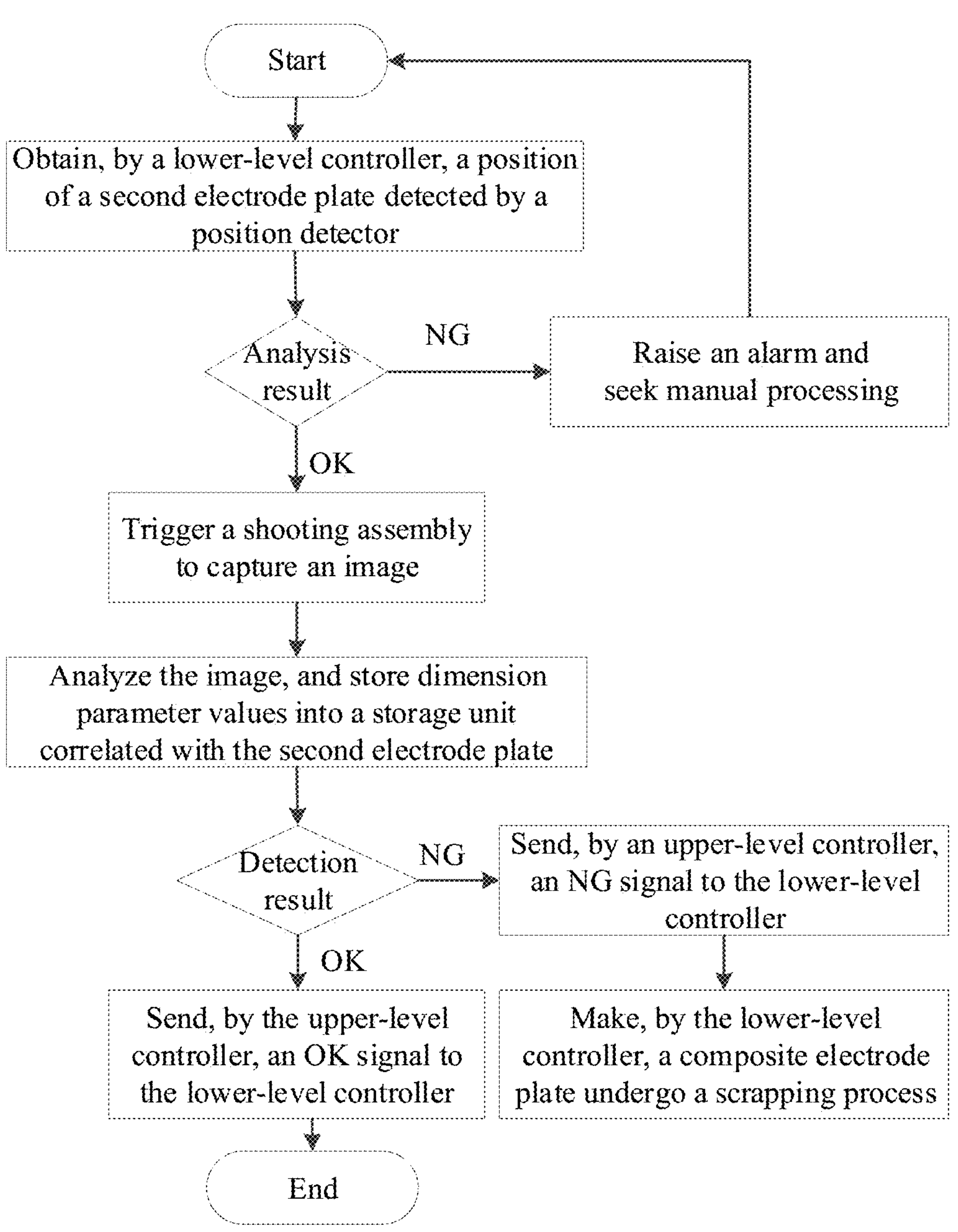
FIG. 8 is a schematic flowchart of a dimension detection method according to some other embodiments of this application.

As shown in FIG. 8, the working principles of the dimension detection apparatus 100 are as follows:

First, based on the position of the second electrode plate 12 detected by the position detector 5, the lower-level controller 41 determines whether to turn on a shooting assembly 1 on an upper side or a shooting assembly on a lower side. If the analysis result is normal, a corresponding shooting assembly 1 is triggered to capture an image; or, if the analysis result is not normal, an alarm is raised to seek manual processing.

Second, the upper-level controller 42 analyzes the image. Each shooting component 1' captures a single frame. The upper-level controller 42 may obtain image variables of each shooting component 1', run a corresponding image algorithm, and perform rectilinear fitting for characteristic edges of the first electrode plate 11, the second electrode plate 12, and the insulator 13, so as to calculate an overhang distance between the first electrode plate 11 and the second electrode plate 12, that is, a distance by which the edge of the negative electrode plate exceeds the edge of the positive electrode plate. Further, other dimensional parameters may be calculated.

Third, the dimensional parameters calculated by the upper-level controller 42 are stored into a storage unit 61 correlated with the second electrode plate 12. The upper-level controller 42 determines whether the detection results of all the dimensional parameters meet the requirements; and, if the overall results are normal, sends an OK signal to the lower-level controller 41 so that the composite electrode plate 10 proceeds with the subsequent stacking process; or, if the overall results are not normal, sends an NG signal to the lower-level controller 41 so that the composite electrode plate 10 undergoes a scrapping process.

Figure 7:
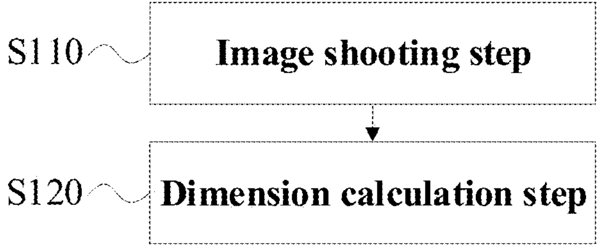
FIG. 7 is a schematic flowchart of a dimension detection method according to some embodiments of this application.

Next, this application further provides a dimension detection method. In some embodiments, as shown in FIG. 7, the dimension detection method includes:

S110. an image shooting step: shooting images of four corner regions of a corresponding second electrode plate 12 in a composite electrode plate 10 by using four shooting components 1' in a shooting assembly 1 respectively, where the composite electrode plate 10 includes a plurality of continuous first electrode plates 11, a plurality of second electrode plates 12, and two insulators 13; the plurality of first electrode plates 11 are sandwiched between the two insulators 13 and arranged in parallel along an extension direction of the insulators 13; and the plurality of second electrode plates 12 are arranged alternately on outer sides of the two insulators 13 along the extension direction of the insulators, and correspond one-to-one to the plurality of first electrode plates 11; and

S120. a dimension calculation step: obtaining dimensional parameters of the composite electrode plate 10 based on a captured image.

Step S120 is performed after step S110.

In this embodiment, the shooting assemblies 1 on the two sides of the composite electrode plate 10 detect the second electrode plate 12 on the front side and the second electrode plate on the back side respectively, thereby implementing real-time dimension detection of the composite electrode plate 10. During the movement of the composite electrode plate 10, the shooting assemblies 1 can detect each second electrode plate 12 successively to implement detection of all the second electrode plates 12 and ensure that the dimensional parameters of the composite electrode plates 10 meet the requirements, and especially ensure consistency of the amounts by which the negative electrode plates exceed the positive electrode plates in width. This improves the precision of alignment between the positive electrode plates and the negative electrode plates, prevents lithium plating, exerts the full functions of the positive active material of the positive electrode plate, improves the performance of the electrode assembly formed by the composite electrode plate 10, increases the cycle life and fast-charge capacity of the battery, and improves the safety of the battery in use.

Moreover, the four shooting components 1' photograph the four corner regions of the second electrode plate 12 on the same side of the composite electrode plate 10. In this way, each shooting component 1' photographs just a relatively small region, thereby alleviating the perspective distortion. For the same second electrode plate 12, by detecting the degree of alignment with the first electrode plate 11 in the four corner regions, the degree of alignment of the entire second electrode plate 12 relative to the first electrode plate 11 is ensured, and the accuracy of detection of dimensional parameters is improved.

In some embodiments, before the image shooting step in step S110, the dimension detection method of this application further includes:

detecting a position of the second electrode plate 12 to be photographed; and triggering, based on the detected position of the second electrode plate 12, a corresponding shooting assembly 1 to turn on.

The position of the second electrode plate 12 may be detected by the position detector 5. The position information of the second electrode plate 12 to be photographed, which is detected by the position detector 5, includes information indicating which side of the first electrode plate 11 the second electrode plate 12 is located at. This information is used for determining the shooting assembly that needs to be turned on. Optionally, the position information may further include a distance between the second electrode plate 12 to be photographed and the shooting assembly 1. This information is used for determining the time point at which the shooting assembly 1 is to be turned on. The controller 4 may turn off the shooting assembly 1 upon completion of the shooting. A detection signal of the position detector 5 may be transmitted to a lower-level controller 41. The lower-level controller 41 controls the shooting assembly 1 to turn on.

In this embodiment, the position of the second electrode plate 12 to be photographed is detected beforehand, so as to accurately control the shooting assembly 1 on the corresponding side to turn on, reliably implement detection on all the second electrode plates 12, and prevent the possibility of a detection omission; or, further, determine a time point at which the shooting assembly 1 is to be turned on, prevent mutual interference between the two shooting assemblies 1 on the basis of photographing the second electrode plates 12 in time, and reduce power consumption in the dimension detection process.

In some embodiments, the dimension calculation step in step S120 specifically includes: obtaining, based on the image captured by each shooting component 1', a first deviation distance W1 between an edge of the first electrode plate 11 and an edge of the second electrode plate 12, and/or a second deviation distance W2 between an edge of the insulator 13 and the edge of the first electrode plate 11 or the second electrode plate 12, whichever is wider.

The specific definitions and determining method of the first deviation distance W1 and the second deviation distance W2 have been described in the preceding embodiments, details of which are omitted here.

In this embodiment, the alignment parameters of the corner regions of the second electrode plate 12 can be obtained based on the images captured by each shooting component 1'. For a second electrode plate 12 that is rectangular, the degree of alignment between the entire second electrode plate 12 and the first electrode plate 11 can be ensured by ensuring the alignment between each corner region, so as to prevent lithium plating, exert the full functions of the positive active material of the positive electrode plate, improve the performance of the electrode assembly formed by the composite electrode plate 10, and improve the cycle life and fast-charge capacity of the battery. In addition, this also ensures alignment of the insulators 13 with the first electrode plate 11 or the second electrode plate 12 in the entire extension direction, prevents a short circuit between the first electrode plate 11 and the second electrode plate 12, and in turn, improves the safety of the battery in use.

In some embodiments, the dimension calculation step in step S120 specifically includes: obtaining, based on images captured by any two adjacent shooting components 1' in an identical shooting assembly 1, a dimension of at least one of the first electrode plate 11, the second electrode plate 12, or the insulator 13 along a direction of spacing out the two adjacent shooting components 1'.

The dimension calculation method in this step has been described in the preceding embodiment, details of which are omitted here.

In this embodiment, the dimension of the first electrode plate 11, the second electrode plate 12, or the insulator 13 along the direction of spacing out the two adjacent shooting components 1' can be obtained based on the images captured by two adjacent shooting components 1'. Therefore, whether the dimensions of the first electrode plate 11, the second electrode plate 12, or the insulator 13 meet requirements can be detected in real time during the movement of the composite electrode plate 10, thereby improving the performance of the electrode assembly formed by the composite electrode plate 10.

In some embodiments, in order to determine the dimensional parameters of the composite electrode plate 10 based on the image, before the image shooting step in step S110, the dimension detection method of this application further includes: calibrating each shooting component 1' in the two shooting assemblies 1 to obtain actual dimensions corresponding to a single pixel in the image captured by a single shooting component 1', and/or a distance between any two pixels in two images captured by adjacent shooting components 1'.

In this embodiment, by calibrating each shooting component 1', the following purposes are fulfilled: (i) the physical dimensions corresponding to a single pixel in the image can be established, and therefore, the actual physical distance can be obtained based on the correspondence established in the calibration and based on the distance between pixels on the edges of any two of the first electrode plate 11, the second electrode plate 12, or the insulator 13 in the images; and (ii) the corresponding physical distance between two pixels in adjacent images can be obtained by measuring the mounting distance between adjacent shooting components 1' and by using a standard calibration tool with known physical dimensions. In this way, the actual physical distance can be obtained based on the correspondence established in the calibration and based on the distance between the pixels on opposite edges of the first electrode plate 11, the second electrode plate 12, or the insulator 13 in the adjacent images.

In some embodiments, the dimension detection method of this application further includes: storing, after the dimension calculation step in step S120, the obtained dimensional parameters into a storage unit correlated with the second electrode plate 12.

In this embodiment, the dimensional parameters of a plurality of second electrode plates 12 can be stored into correlated storage units 61. Therefore, the dimensional parameters of a specific second electrode plate 12 can be quickly located or retrieved subsequently. For the dimensional parameters that do not meet the requirements, the second electrode plate 12 can be located quickly, thereby facilitating subsequent data analysis and product improvement.

In some embodiments, after the dimension calculation step in step S120, the dimension detection method of this application further includes: determining whether the obtained dimensional parameters all meet preset parameter ranges; and, when the obtained dimensional parameters all meet the preset parameter ranges, causing the composite electrode plate 10 to proceed with subsequent operations; or, when the obtained dimensional parameters do not all meet the preset parameter ranges, causing the composite electrode plate 10 to undergo a scrapping process.

If the alignment parameters, the dimensions of the first electrode plate 11, the dimensions of the second electrode plate 12, and the dimensions of the insulator 13 all meet their respective preset parameter ranges, where the alignment parameters include: a first deviation distance W1 and a second deviation distance W2, then it is determined that the dimensional parameters of the composite electrode plate 10 meet the requirements, and therefore, the composite electrode plate 10 is allowed to proceed with the subsequent stacking process. If any one of the dimensional parameters does not meet the requirements, the composite electrode plate is scrapped directly without participating in the subsequent stacking process.

In this embodiment, based on the obtained dimensional parameters of the composite electrode plate 10, it is determined whether the composite electrode plate 10 is qualified. The unqualified composite electrode plate 10 is scrapped before the stacking process, thereby improving the production efficiency of the electrode assembly, and preventing the production efficiency from being impaired by the phenomenon that the dimensional parameters are detected as unqualified after formation of the electrode assembly.

In some embodiments, the dimension detection method of this application further includes: causing, before shooting, two groups of grippers 31 to clamp the composite electrode plate 10 from two sides of the composite electrode plate 10 along a thickness direction, and causing the two groups of grippers 31 to keep moving synchronously with the composite electrode plate 10.

In this embodiment, the composite electrode plate 10 is clamped by two groups of grippers 31 during the shooting, thereby preventing the four corners of the second electrode plate 12 from loosening or warping due to poor combining, enabling the second electrode plate 12 to closely fit the insulator 13 in the four corner regions, and preventing dimensional measurement anomalies caused by poor combining and looseness in the four corner regions of the second electrode plate 12. Moreover, this also ensures stable distances between the composite electrode plate 10 and the four shooting components 1', improves shooting stability, and in turn, improves accuracy of detection of the dimensional parameters of the composite electrode plate 10. In addition, the two groups of grippers 31 move synchronously with the composite electrode plate 10, thereby reducing the abrasion of the composite electrode plate 10 sustained from the grippers 31, preventing the active material from falling off the second electrode plate 12, and ensuring the performance of the electrode assembly.

In some embodiments, the causing two groups of grippers 31 to clamp the composite electrode plate 10 from two sides of the composite electrode plate 10 along a thickness direction includes:

causing the two groups of grippers 31 to accelerate from an initial position along an extension direction of the composite electrode plate 10; and causing, when a speed of the two groups of grippers 31 reaches a running speed of the composite electrode plate 10, the two groups of grippers 31 to approach each other to clamp the composite electrode plate 10.

In this embodiment, the first driving component 32 may control the two groups of grippers 31 to move along the extension direction of the composite electrode plate 10. The second driving component 33 controls the two groups of grippers 31 to clamp or loosen the composite electrode plate. In this way, the two actions are independent of each other, the two groups of grippers 31 can reliably clamp the composite electrode plate 10 during shooting, and the two groups of grippers 31 can clamp the composite electrode plate 10 when accelerating to a speed identical to the running speed of the composite electrode plate 10, thereby reducing the abrasion on the surface of the composite electrode plate 10, and preventing the active material from falling off.

In some embodiments, the dimension detection method of this application further includes:

causing, after the shooting assemblies 1 complete shooting, the two groups of grippers 31 to move away from each other to release the composite electrode plate 10; and causing, after the composite electrode plate 10 is released, the two groups of grippers 31 to return to the initial position.

This embodiment allows the two groups of grippers 31 to release the composite electrode plate 10 first and then return to the initial position in an opposite direction after the shooting assemblies 1 complete shooting. In this way, the two groups of grippers 31 can return to the initial position without affecting the running of the composite electrode plate 10, and reduce the abrasion of the second electrode plate 12. In addition, the two groups of grippers can quickly return to the initial position after being detached from the composite electrode plate 10, so as to clamp the composite electrode plate 10 again upon detecting a subsequent second electrode plate 12.

In some embodiments, the controller 4 mentioned above may be a general-purpose processor, a programmable logic controller (Programmable Logic Controller, PLC for short), a digital signal processor (Digital Signal Processor, DSP for short), an application-specific integrated circuit (Application Specific Integrated Circuit, ASIC for short), a field programmable gate array (Field-Programmable Gate Array, FPGA for short), or another programmable logical device, a discrete gate, or a transistor logical device, a discrete hardware component, or any combination thereof for implementing the functions described herein.

Although this application has been described with reference to exemplary embodiments, various improvements may be made to the embodiments without departing from the scope of this application, and some components described in the embodiments may be replaced with equivalents. Particularly, to the extent that no structural conflict exists, various technical features mentioned in different embodiments may be combined in any manner. This application is not limited to the specific embodiments disclosed herein, but includes all technical solutions falling within the scope of the claims.

What is claimed is:

1. A dimension detection apparatus, configured to detect a composite electrode plate, wherein the composite electrode plate comprises a plurality of first electrode plates, a plurality of second electrode plates, and two insulators; the first electrode plates are of an opposite polarity to the second electrode plates; the plurality of first electrode plates are sandwiched between the two insulators and arranged continuously in parallel along an extension direction of the insulators; the plurality of second electrode plates are arranged alternately on outer sides of the two insulators along the extension direction of the insulators, and correspond one-to-one to the plurality of first electrode plates; and the dimension detection apparatus comprises:

two shooting assemblies, disposed on two sides of the composite electrode plate respectively along a thickness direction of the composite electrode plate, and configured to photograph one of the plurality of second electrode plates on a first outer side of the outer sides of the two insulators, and another one of the plurality of second electrode plates on a second outer side of the outer sides of the two insulators that is closest to the one of the plurality of the second electrode plates on the first outer side, respectively, the first outer side being opposite to the second outer side, wherein each of the shooting assemblies comprises four shooting components configured to shoot images of four corner regions of one of the second electrode plates respectively, the two shooting assemblies are arranged in a staggered manner along an extension direction of the composite electrode plate, and on a plane perpendicular to the thickness direction, a projection of the four shooting components of one of the two shooting assemblies and a projection of the four shooting components of another one of the two shooting assemblies do not overlap with each other; and a controller, communicatively connected to the two shooting assemblies, wherein the controller is configured to obtain dimensional parameters of the composite electrode plate based on the captured images.

2. The dimension detection apparatus according to claim 1, further comprising:

a position detector, wherein the position detector is configured to detect a position of the second electrode plate to be photographed, and the controller is configured to trigger, based on the position of the second electrode plate detected by the position detector, a corresponding shooting assembly to turn on.

3. The dimension detection apparatus according to claim 1, wherein the controller is configured to obtain, based on the image captured by each shooting component, a first deviation distance between an edge of the first electrode plate and an edge of the second electrode plate, and/or a second deviation distance between an edge of the insulator and the edge of the first electrode plate or the second electrode plate, whichever is wider.

4. The dimension detection apparatus according to claim 1, wherein the controller is configured to obtain, based on images captured by any two adjacent shooting components in one of the two shooting assemblies, a dimension of at least one of the first electrode plate, the second electrode plate, or the insulator along a direction of spacing out the two adjacent shooting components.

5. The dimension detection apparatus according to claim 1, further comprising:

a memory, wherein the memory comprises a plurality of storage units, each of the storage units is disposed by being correlated with the second electrode plate, and the controller is configured to store obtained dimensional parameters into the storage unit correlated with the second electrode plate.

6. The dimension detection apparatus according to claim 1, wherein the controller is configured to determine whether the obtained dimensional parameters all meet preset parameter ranges, and, when the obtained dimensional parameters all meet the preset parameter ranges, cause the composite electrode plate to proceed with subsequent operations, or, when the obtained dimensional parameters do not all meet the preset parameter ranges, cause the composite electrode plate to undergo a scrapping process.

7. The dimension detection apparatus according to claim 1, further comprising:

two light source groups, wherein the two light source groups are disposed corresponding to the two shooting assemblies respectively, each of the light source groups comprises a first light source and a second light source of different luminous colors, and the first light source and the second light source are arranged on two sides of the composite electrode plate respectively along the thickness direction.

8. The dimension detection apparatus according to claim 1, further comprising a clamping assembly, wherein the clamping assembly comprises two groups of grippers, the two groups of grippers are disposed on two sides of the composite electrode plate respectively along the thickness direction, and are movable along an extension direction of the composite electrode plate, and the two groups of grippers are configured to clamp the composite electrode plate during shooting and keep moving synchronously with the composite electrode plate.

9. The dimension detection apparatus according to claim 8, wherein:

the clamping assembly further comprises:

a first driving component, configured to drive the two groups of grippers to move along the extension direction of the composite electrode plate; and a second driving component, configured to drive the two groups of grippers to move away from or closer to each other; and the controller is configured to cause, after the first driving component drives the two groups of grippers to accelerate from an initial position to a running speed of the composite electrode plate, the second driving component to drive the two groups of grippers to approach each other to clamp the composite electrode plate.

10. The dimension detection apparatus according to claim 9, wherein the controller is configured to cause, after the shooting assemblies complete shooting, the second driving component to drive the two groups of grippers to move away from each other to release the composite electrode plate, and cause the first driving component to drive the two groups of grippers to return to the initial position.

11. A stacking device, comprising:

an electrode plate combining apparatus, configured to combine a plurality of first electrode plates, a plurality of second electrode plates, and two insulators to form a composite electrode plate, wherein the plurality of first electrode plates are arranged continuously;

a stacking platform, configured to fold the composite electrode plate into a stack-type electrode assembly; and the dimension detection apparatus according to claim 1, disposed between the electrode plate combining apparatus and the stacking platform, and configured to detect the composite electrode plate.

12. The dimension detection apparatus according to claim 1, further comprising:

a clamping assembly, wherein the clamping assembly comprises two groups of grippers, the two groups of grippers are disposed on two sides of the composite electrode plate respectively along the thickness direction, and are movable along an extension direction of the composite electrode plate, the two groups of grippers are configured to clamp the composite electrode plate during shooting and keep moving synchronously with the composite electrode plate, and the two groups of grippers are plate-like structures made of a transparent material.

13. The dimension detection apparatus according to claim 1, further comprising:

two light source groups disposed corresponding to the two shooting assemblies, respectively, wherein each of the light source groups comprises a first light source and a second light source of different luminous colors, the first light source and the second light source are arranged on two sides of the composite electrode plate along the thickness direction, respectively, the second light source comprises a surface light source and a line light source, a luminosity of the line light source is greater than a luminosity of the surface light source, and the line light source is disposed opposite to the first light source.

14. A dimension detection method, comprising:

an image shooting step: shooting images of four corner regions of a corresponding second electrode plate in a composite electrode plate by using four shooting components in each of two shooting assemblies, respectively, wherein the composite electrode plate comprises a plurality of first electrode plates, a plurality of second electrode plates, and two insulators; the plurality of first electrode plates are sandwiched between the two insulators and arranged continuously in parallel along an extension direction of the insulators; the plurality of second electrode plates are arranged alternately on outer sides of the two insulators along the extension direction of the insulators, and correspond one-to-one to the plurality of first electrode plates; the two shooting assemblies are disposed on two sides of the composite electrode plate respectively along a thickness direction of the composite electrode plate, and configured to photograph one of the plurality of second electrode plates on a first outer side of the outer sides of the two insulators, and another one of the plurality of second electrode plates on a second outer side of the outer sides of the two insulators that is closest to the one of the plurality of the second electrode plates on the first outer side, respectively, the first outer side being opposite to the second outer side; and the two shooting assemblies are arranged in a staggered manner along an extension direction of the composite electrode plate, and on a plane perpendicular to the thickness direction, a projection of the four shooting components of one of the two shooting assemblies and a projection of the four shooting components of another one of the two shooting assemblies do not overlap with each other; and a dimension calculation step: obtaining dimensional parameters of the composite electrode plate based on the captured images.

15. The dimension detection method according to claim 14, further comprising, before the image shooting step:

detecting a position of the second electrode plate to be photographed; and triggering, based on the detected position of the second electrode plate, a corresponding one of the two shooting assemblies to turn on.

16. The dimension detection method according to claim 14, wherein the dimension calculation step specifically comprises:

obtaining, based on the image captured by each shooting component, a first deviation distance between an edge of the first electrode plate and an edge of the second electrode plate, and/or a second deviation distance between an edge of the insulator and the edge of the first electrode plate or the second electrode plate, whichever is wider.

17. The dimension detection method according to claim 14, wherein the dimension calculation step specifically comprises:

obtaining, based on images captured by any two adjacent shooting components in one of the two shooting assemblies, a dimension of at least one of the first electrode plate, the second electrode plate, or the insulator along a direction of spacing out the two adjacent shooting components.

18. The dimension detection method according to claim 14, further comprising:

determining whether the obtained dimensional parameters all meet preset parameter ranges, and, when the obtained dimensional parameters all meet the preset parameter ranges, causing the composite electrode plate to proceed with subsequent operations, or, when the obtained dimensional parameters do not all meet the preset parameter ranges, causing the composite electrode plate to undergo a scrapping process.

19. The dimension detection method according to claim 14, further comprising:

causing, before shooting, two groups of grippers to clamp the composite electrode plate from two sides of the composite electrode plate along a thickness direction, and causing the two groups of grippers to keep moving synchronously with the composite electrode plate.

20. A dimension detection apparatus, configured to detect a composite electrode plate, wherein the composite electrode plate comprises a plurality of first electrode plates, a plurality of second electrode plates, and two insulators; the first electrode plates are of an opposite polarity to the second electrode plates; the plurality of first electrode plates are sandwiched between the two insulators and arranged continuously in parallel along an extension direction of the insulators; the plurality of second electrode plates are arranged alternately on outer sides of the two insulators along the extension direction of the insulators, and correspond one-to-one to the plurality of first electrode plates; and the dimension detection apparatus comprises:

two shooting assemblies, disposed on two sides of the composite electrode plate respectively along a thickness direction of the composite electrode plate, and configured to photograph one of the plurality of second electrode plates on a first outer side of the outer sides of the two insulators, and another one of the plurality of second electrode plates on a second outer side of the outer sides of the two insulators that is closest to the one of the plurality of the second electrode plates on the first outer side, respectively, the first outer side being opposite to the second outer side, wherein each of the shooting assemblies comprises four shooting components configured to shoot images of four corner regions of one of the second electrode plates respectively;

a controller, communicatively connected to the two shooting assemblies, wherein the controller is configured to obtain dimensional parameters of the composite electrode plate based on the captured images; and two light source groups disposed corresponding to the two shooting assemblies, respectively, wherein each of the light source groups comprises a first light source and a second light source of different luminous colors, the first light source and the second light source are arranged on two sides of the composite electrode plate along the thickness direction, respectively, the second light source comprises a surface light source and a line light source, a luminosity of the line light source is greater than a luminosity of the surface light source, and the line light source is disposed opposite to the first light source.

* * * * *